(12) United States Patent
Chen

(10) Patent No.: US 8,454,474 B2
(45) Date of Patent: Jun. 4, 2013

(54) MANIPULATOR ARM MECHANISM

(75) Inventor: Wen-Sheng Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 243 days.

(21) Appl. No.: 13/029,310

(22) Filed: Feb. 17, 2011

(65) Prior Publication Data

US 2012/0077637 A1    Mar. 29, 2012

(30) Foreign Application Priority Data

Sep. 29, 2010 (CN) .......................... 2010 1 0296657

(51) Int. Cl.
*F16H 57/08* (2006.01)
(52) U.S. Cl.
USPC .......................................................... 475/343
(58) Field of Classification Search
USPC .......................................................... 475/343
See application file for complete search history.

(56) References Cited

U.S. PATENT DOCUMENTS

| | | | |
|---|---|---|---|
| 6,695,738 B2* | 2/2004 | Sullivan et al. | 475/222 |
| 2007/0213171 A1* | 9/2007 | Pizzichil et al. | 475/331 |

* cited by examiner

*Primary Examiner* — Edwin A Young
(74) *Attorney, Agent, or Firm* — Altis Law Group, Inc.

(57) ABSTRACT

A manipulator arm mechanism includes a pedestal, a driving member, a speed reducer, and an output rocker arm. The driving member is mounted on the pedestal and has an output shaft. The speed reducer is assembled to the pedestal and connects with the output shaft of the driving member. The speed reducer includes a first transmission assembly, a second transmission assembly, and a third transmission assembly engaging each other in turn. The third transmission assembly is a planetary gear set and includes a sun gear rotated by the second transmission assembly, a ring gear, and a plurality of planetary gears. The ring gear is coaxially sleeved on the sun gear. The planetary gears are assembled between and rotatably mesh with the sun gear and the ring gear. The output rocker arm is fixed with the plurality of planetary gears.

20 Claims, 3 Drawing Sheets

MANIPULATOR ARM MECHANISM

BACKGROUND

1. Technical Field

The present disclosure generally relates to robotics, and particularly, to a manipulator arm mechanism.

2. Description of Related Art

With developments in manufacturing technology, arm-mounted manipulators are widely applied in environments considered hazardous or difficult for human operators.

A commonly used manipulator arm mechanism includes a rotating assembly driven by a motor. Since the output speed of the motor is very high, a speed reducer is employed to slow down the output speed of the motor to a rate compatible with the rotating assembly. However, commonly used speed reducers have a complicated structure, and often constitutes a volume occupying considerable amount of space within the manipulator.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the manipulator arm mechanism. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
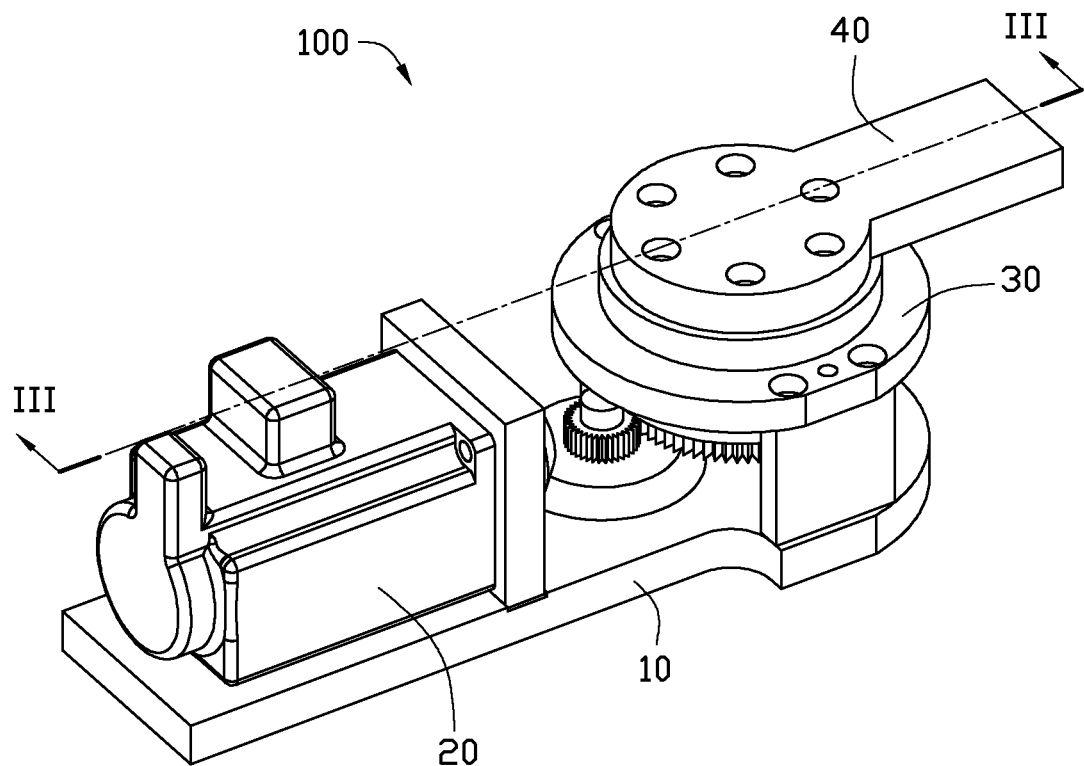
FIG. 1 is an assembled, isometric view of a manipulator arm mechanism.

Referring to FIG. 1, a manipulator arm mechanism 100 includes a pedestal 10, a driving member 20, a speed reducer 30 and an output rocker arm 40. The driving member 20 and the speed reducer 30 are oppositely mounted on the pedestal 10 and connected to each other. The output rocker arm 40 connects with the speed reducer 30 and is positioned above the speed reducer 30 in the illustrated embodiment.

Figure 2:
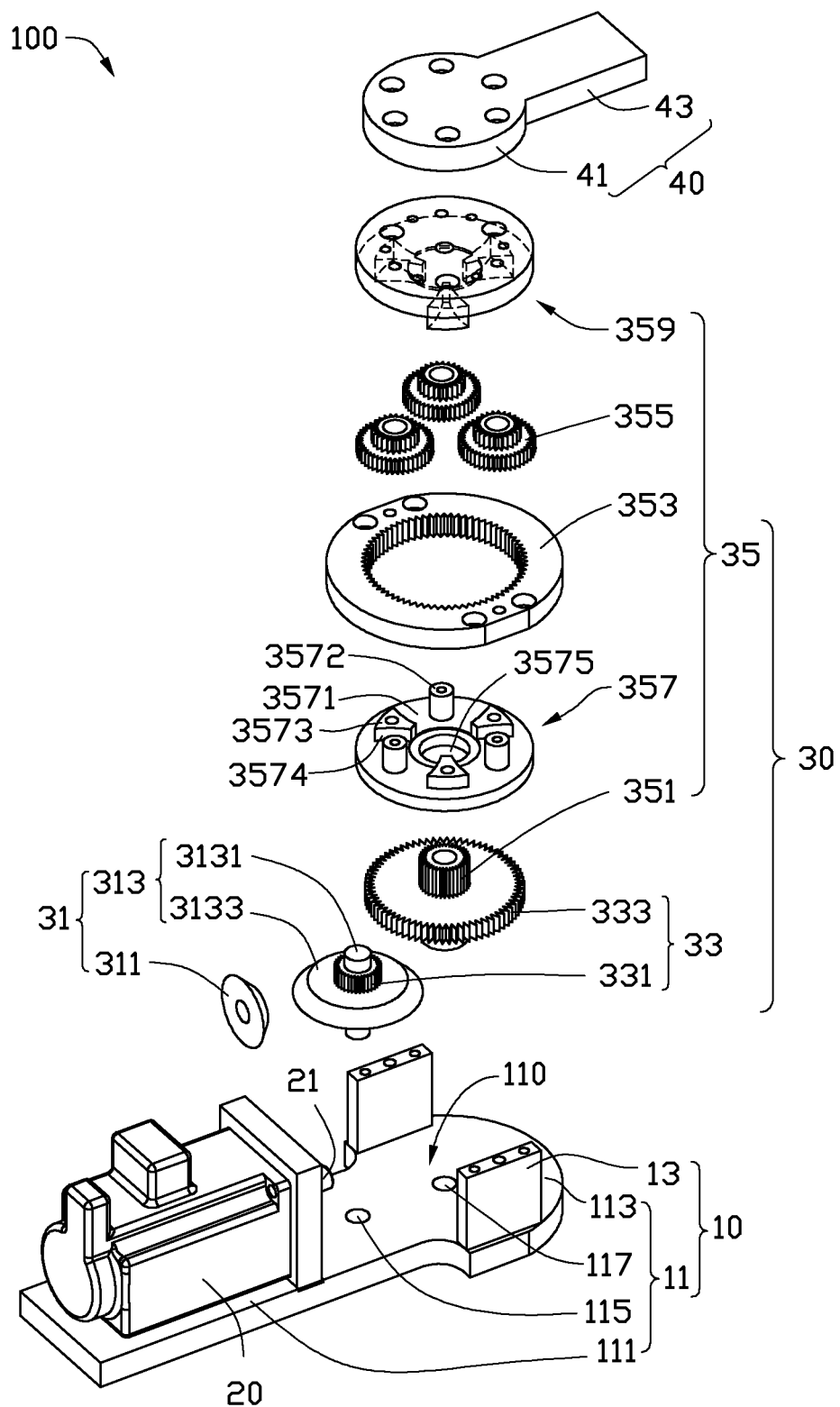
FIG. 2 is an exploded, isometric view of the manipulator arm mechanism of FIG. 1.

Also referring to FIG. 2, the pedestal 10 includes a base body 11 and at least one support member 13 fixed on the base body 11. The base body 11 is substantially bar shaped and defines a first assembly portion 111 adjacent to one end of the base body 11, and an opposite second assembly portion 113 adjacent to the other end of the base body 11. A first assembly hole 115 and a second assembly hole 117 are separately defined through the second assembly portion 113 of the base body 11. In the illustrated embodiment, the support members 13 are two support blocks oppositely formed at two sides of the base body 11 and adjacent to the second assembly portion 113. The two support blocks of the support member 13 and the second assembly portion 113 cooperatively form a receiving space 110 for receiving the speed reducer 30.

The driving member 20 is an electric motor mounted on the first assembly portion 111 of the base body 11 in the illustrated embodiment, and includes an output shaft 21 facing the second assembly portion 113. It should be pointed out that the driving member 20 may alternatively be a hydraulic motor, a pneumatic cylinder or other type of driving member.

The speed reducer 30 is mounted on the second assembly portion 113 of the base body 11 and connects with the output shaft 21 of the driving member 20. The speed reducer 30 reduces the output speed of the driving member 20, and includes a first transmission assembly 31, a second transmission assembly 33 and a third transmission assembly 35 engaging each other in turn.

The first transmission assembly 31 is a bevel gear assembly for changing a rotating direction of the output shaft 21 of the driving member 20. In the illustrated embodiment, the first transmission assembly 31 includes a first bevel gear 311 meshing with a second bevel gear 313. The first bevel gear 311 is fixedly sleeved on the distal end of the output shaft 21 of the driving member 20. The second bevel gear 313 includes a central shaft 3131 and a bevel gear portion 3133 fixedly sleeved on the central shaft 3131. The central shaft 3131 of the second bevel gear 313 hinges into the first assembly hole 115 of the second assembly portion 113 of the base body 11, and the bevel gear portion 3133 meshes with the corresponding first bevel gear 311.

The second transmission assembly 33 is assembled adjacent to the first transmission assembly 31. The second transmission assembly 33 includes a driving gear 331 and an active gear 333. The driving gear 331 is a cylindrical gear coaxially sleeved on the central shaft 3131 of the second bevel gear 313 together with the bevel gear portion 3133. The active gear 333 is hinged into the second assembly hole 117 of the second assembly portion 113 of the base body 11 and meshes with the corresponding driving gear 331.

The third transmission assembly 35 is a planetary gear set, and includes a sun gear 351, a ring gear 353, a plurality of planetary gears 355, a planetary gear carrier 357 and a connecting member 359. The sun gear 351 is a central gear and is coaxially fixed to the active gear 333. It is to be understood that the sun gear 351 may be integrally and coaxially formed with the active gear 333 of the second transmission assembly 35. The ring gear 353 is an internal gear. An outer diameter of the sun gear 351 is less than an inner diameter of the ring gear 353. The ring gear 353 is fixed to the support member 13 of the base body 11 and coaxially positioned above the active gear 333 of the second transmission assembly 35 and coaxially surrounds the sun gear 351. As the sun gear 351 and the ring gear 353 are assembled together, the sun gear 351 and the ring gear 353 cooperatively form an annular receiving space 350 for assembling the plurality of planetary gears 355.

The planetary gear carrier 357 is rotatably sleeved on the sun gear 351 and carries the plurality of the planetary gears 355, enabling assembly thereof within the receiving space 350 formed by the sun gear 351 and the ring gear 353. That is, the plurality of planetary gears 355 meshes with the sun gear 351 and the ring gear 353. The planetary gear carrier 357 includes a main body 3571, a plurality of wheel spindles 3572 and a plurality of spacing blocks 3573. The main body 3571 is substantially disk shaped and includes a shaft hole 3575 defined through a central portion thereof. The plurality of wheel spindles 3572 are evenly separately formed on the main body 3571 and positioned surrounding the shaft hole 3575. The plurality of spacing blocks 3573 is evenly distributed on the main body 3571 and respectively positioned between every two wheel spindles 3572, such that every two spacing blocks 3573 cooperatively form an accommodating chamber (not labeled) for receiving the corresponding planetary gear 355.

The illustrated embodiment shows three planetary gears 355, three wheel spindles 3572 and three spacing blocks 3573. Each spacing block 3573 is substantially trapezoid and includes two opposite curved surfaces 3574 facing the adjacent corresponding wheel spindle 3572.

The connecting member 359 is detachably assembled to the planetary gear carrier 357 and is substantially the same shape as the planetary gear carrier 357.

The output rocker arm 40 includes a fixing portion 41 and a swing arm 43 extending from the fixing portion 41. The fixing portion 41 is fixed with the connecting member 359.

Figure 3:
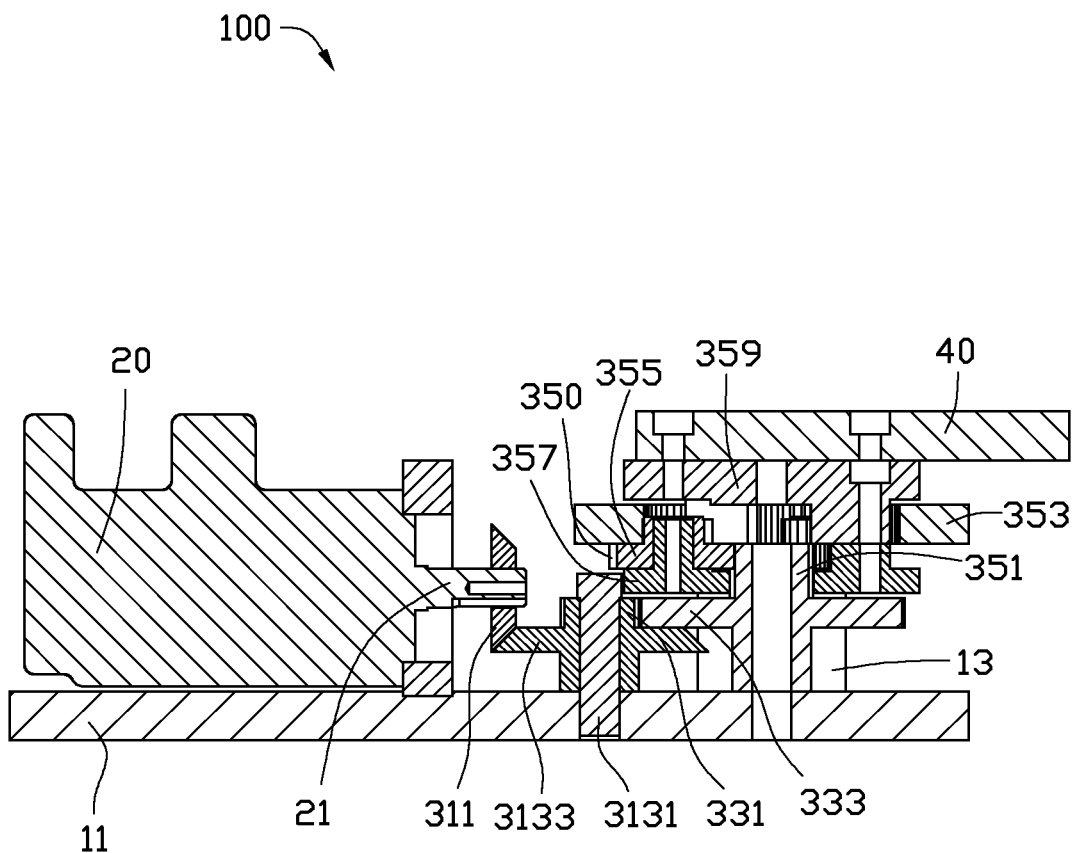
FIG. 3 is a cross section of the manipulator arm mechanism taken along line III-III of FIG. 1.

Also referring to FIG. 3, during assembly of the manipulator arm mechanism 100, the driving member 20 is mounted on the first assembly portion 111 of the base body 11 with the output shaft 21 facing the second assembly portion 113. The first bevel gear 311 of the first transmission assembly 31 is fixedly sleeved on the distal end of the output shaft 21. The second bevel gear 313 is hinged into the first assembly hole 115 of the second assembly portion 113 of the base body 11, and the bevel gear portion 3133 thereof rotatably meshes with the corresponding first bevel gear 311.

The active gear 333 of the second transmission assembly 33 is hinged to the second assembly hole 117 of the second assembly portion 113 and meshes with the corresponding driving gear 331 coaxially fixed to the second bevel gear 313. The ring gear 353 is fixed to the support member 13 of the base body 11 and coaxially surrounds the sun gear 351. The sun gear 351 and the ring gear 353 cooperative from an annular receiving space 350. The planetary gear carrier 357 is rotatably sleeved on the sun gear 351 and coaxially received within the receiving space 350 to resist the active gear 333. The plurality of planetary gears 355 is respectively sleeved on the plurality of wheel spindles 3572 of the planetary gear carrier 357 to mesh with the sun gear 351 and the ring gear 351. The connecting member 359 is assembled to the planetary gear carrier 357, such that the plurality of planetary gears 355 are sandwiched between the connecting member 359 and the planetary gear carrier 357. The fixing portion 41 of the output rocker arm 40 is fixed to the connecting member 359 to complete the assembly of the manipulator arm mechanism 100.

In use, as the driving member 20 is operated, the output shaft 21 together with the first bevel gear 311 of the first transmission assembly 31 is rotated at a relatively high speed. The second bevel gear 313 together with the driving gear 331 of the second transmission assembly 33 are rotated perpendicular to the axis of the output shaft 21. After that, the active gear 333 together with the sun gear 351 of the third transmission assembly 35 is also rotated and transfers the rotation to the ring gear 353 and the plurality of the planetary gears 355 of the third transmission assembly 35. Finally, the plurality of the planetary gears 355 are rotated together with the planetary gear carrier 357 and the output rocker arm 40 relative to the ring gear 353.

Alternatively, the planetary gear carrier 357 can be fixed to the pedestal 10, in which case the ring gear 353 is coaxially rotatably sleeved on the sun gear 351 and cooperatively forms an annular receiving space 350 together with the sun gear 351 for assembling the plurality of planetary gears 355. The connecting member 359 and the output rocker arm 40 are fixed with the ring gear 353.

It is to be understood that the planetary gear carrier 357 and the connecting member 359 can also be omitted, such that the plurality of planetary gears 355 are directly rotatably sandwiched between and mesh with the sun gear 351 and the ring gear 353, and fixed with the output rocker arm 40.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A manipulator arm mechanism, comprising:
    a pedestal;
    a driving member mounted on the pedestal and having an output shaft;
    a speed reducer assembled to the pedestal and connecting with the output shaft of the driving member, the speed reducer comprising a first transmission assembly, a second transmission assembly, and a third transmission assembly engaging with each other in turn, and the third transmission assembly being a planetary gear set and comprising:
        a sun gear driven by the second transmission assembly to rotate;
        a ring gear fixed to the pedestal and coaxially sleeved on the sun gear, thereby cooperatively forming an annular receiving space between the sun gear and the ring gear; and
        a plurality of planetary gears separately assembled within the receiving space and rotatably mesh with the sun gear and the ring gear; and
            an output rocker arm fixed with the plurality of planetary gears and rotated together with the planetary gears.

2. The manipulator arm mechanism of claim 1, wherein the second and third transmission assemblies are coaxially assembled together.

3. The manipulator arm mechanism of claim 1, wherein the first transmission assembly is a bevel gear assembly for changing a rotating direction of the output shaft of the driving member, the first transmission assembly comprises a first bevel gear fixed to the output shaft and a second bevel gear rotatably engaging with the first bevel gear.

4. The manipulator arm mechanism of claim 3, wherein the pedestal comprises a base body defining a first assembly portion and an opposite second assembly portion, the second assembly portion defines a first assembly hole and a second assembly hole; the driving member is mounted on the first assembly portion, and the speed reducer is mounted on the second assembly portion.

5. The manipulator arm mechanism of claim 4, wherein the second bevel gear comprises a central shaft and a bevel gear portion fixedly sleeved on the central shaft, the central shaft hinged into the first assembly hole of the second assembly portion, and the bevel gear portion rotatably meshes with the corresponding first bevel gear.

6. The manipulator arm mechanism of claim 5, wherein the second transmission assembly is assembled adjacent to the first transmission assembly, and comprises a driving gear and an active gear; the driving gear is a cylindrical gear coaxially fixed to the central shaft of the second bevel gear together with the bevel gear portion, and the active gear is hinged into the second assembly hole of the second assembly portion and meshes with the corresponding driving gear.

7. The manipulator arm mechanism of claim 6, wherein the sun gear is a central gear and is coaxially fixed to the active gear of the second transmission assembly, and the ring gear is an internal gear.

8. The manipulator arm mechanism of claim 7, wherein the pedestal further comprises a support member formed on the base body and adjacent to the second assembly portion, the support member and the second assembly portion cooperatively form a receiving space for receiving the speed reducer; the ring gear is fixed to the support member of the base body and coaxially positioned above the active gear of the second transmission assembly.

9. The manipulator arm mechanism of claim 1, wherein the third transmission assembly further comprises a planetary gear carrier rotatably sleeved on the sun gear for carrying the plurality of the planetary gears and enabling the planetary gears mesh with the sun gear and the ring gear.

10. The manipulator arm mechanism of claim 9, wherein the planetary gear carrier comprises a main body and a plurality of wheel spindles separately formed on the main body, and the plurality of planetary gears are respectively sleeved on the plurality of wheel spindles of the planetary gear carrier to mesh with the sun gear and the ring gear.

11. The manipulator arm mechanism of claim 10, wherein the planetary gear carrier further comprises a plurality of spacing blocks separately formed on the main body and respectively positioned between every two wheel spindles, such that every two spacing blocks cooperatively form an accommodating chamber for receiving the corresponding planetary gear.

12. The manipulator arm mechanism of claim 9, wherein the third transmission assembly further comprises a connecting member assembled to the planetary gear carrier, such that the plurality of planetary gears are sandwiched between the connecting member and the planetary gear carrier, and the output rocker arm is fixed to the connecting member.

13. A manipulator arm mechanism, comprising:
- a pedestal defining a first assembly portion and a second assembly portion adjacent to the first assembly portion;
- a driving member mounted on the first assembly portion of the pedestal and having an output shaft;
- a speed reducer assembled to the second assembly portion of the pedestal and connecting with the output shaft of the driving member, the speed reducer comprising a first transmission assembly, a second transmission assembly, and a third transmission assembly engaging with each other in turn, the third transmission assembly being a planetary gear set and comprising:
- a sun gear driven by the second transmission assembly to rotate;
- a planetary gear carrier fixed to the pedestal;
- a ring gear rotatably sleeved on the sun gear and cooperatively form an annular receiving space together with the sun gear; and
- a plurality of planetary gears separately assembled within the receiving space and rotatably mesh with the sun gear and the ring gear; and
- an output rocker arm fixed with the ring gear and rotated together with the ring gear.

14. The manipulator arm mechanism of claim 13, wherein the first transmission assembly is a bevel gear assembly for changing a rotating direction of the output shaft of the driving member, the first transmission assembly includes a first bevel gear fixed to the output shaft and a second bevel gear rotatably engaging with the first bevel gear.

15. The manipulator arm mechanism of claim 14, wherein the pedestal comprises a base body defining the first assembly portion and the opposite second assembly portion, the second assembly portion defines a first assembly hole and a second assembly hole; the driving member is mounted on the first assembly portion, and the speed reducer is mounted on the second assembly portion.

16. The manipulator arm mechanism of claim 15, wherein the second bevel gear comprises a central shaft and a bevel gear portion fixedly sleeved on the central shaft, the central shaft hinged into the first assembly hole of the second assembly portion, and the bevel gear portion rotatably meshes with the corresponding first bevel gear.

17. The manipulator arm mechanism of claim 14, wherein the second transmission assembly is assembled adjacent to the first transmission assembly, and comprises a driving gear and an active gear; the driving gear is a cylindrical gear coaxially fixed to the central shaft of the second bevel gear together with the bevel gear portion, and the active gear is hinged into the second assembly hole of the second assembly portion and meshes with the corresponding driving gear.

18. The manipulator arm mechanism of claim 13, wherein the planetary gear carrier comprises a main body and a plurality of wheel spindles separately formed on the main body, and the plurality of planetary gears are respectively sleeved on the plurality of wheel spindles of the planetary gear carrier to mesh with the sun gear and the ring gear.

19. The manipulator arm mechanism of claim 18, wherein the planetary gear carrier further comprises a plurality of spacing blocks separately formed on the main body and respectively positioned between every two wheel spindles, such that every two spacing blocks cooperatively form an accommodating chamber for receiving the corresponding planetary gear.

20. The manipulator arm mechanism of claim 19, wherein the third transmission assembly further comprises a connecting member assembled to the ring gear, such that the plurality of planetary gears are sandwiched between the connecting member and the planetary gear carrier, and the output rocker arm is fixed to the connecting member.

\* \* \* \* \*